United States Patent [19]

Pottharst, Jr.

[11] 4,168,211
[45] Sep. 18, 1979

[54] DISTILLATION APPARATUS AND METHOD

[76] Inventor: John E. Pottharst, Jr., 861 Carondelet St., New Orleans, La. 70130

[21] Appl. No.: 914,128

[22] Filed: Jun. 9, 1978

Related U.S. Application Data

[63] Continuation of Ser. No. 605,293, Aug. 18, 1975, abandoned, which is a continuation-in-part of Ser. No. 414,293, Nov. 9, 1973, abandoned.

[51] Int. Cl.² .......................... B01D 1/28; C02B 1/04
[52] U.S. Cl. ........................................ 203/10; 203/20; 203/26; 203/40; 159/14; 159/24 A; 159/27 R; 202/176; 202/197; 202/235; 202/264
[58] Field of Search ................ 203/10, 11, 1, DIG. 17, 203/26, 24, 40, 89, 90, 20; 202/176, 235, 236, 197, 264, 181; 159/14, 27 R, 24 A, 24 B

[56] References Cited

U.S. PATENT DOCUMENTS

| | | | |
|---|---|---|---|
| 768,314 | 8/1904 | Seemen et al. | 159/27 R |
| 2,015,680 | 10/1935 | Kermer | 159/27 A |
| 2,726,198 | 12/1955 | Lowman, Jr. et al. | 159/6 R |
| 3,000,795 | 9/1961 | Goeldner | 203/24 |
| 3,505,111 | 4/1970 | Malek | 159/27 A |

FOREIGN PATENT DOCUMENTS

461208 12/1913 France ........................................ 159/14
446587 5/1936 United Kingdom ...................... 159/24 B

*Primary Examiner*—Wilbur L. Bascomb, Jr.

[57] ABSTRACT

A vapor compression type distillation unit is provided for distilling brackish water or seawater wherein high heat transfer rates are achieved in a vertical shell and tube type vaporizer while avoiding carry-over normally resulting from excessive foaming and its entrainment of liquid droplets in the vapor. A pool of liquid is maintained at the lower end of the vaporizer to be fed into the tubes with the level of the liquid being relatively low so that most of the length of the tube is filled with a frothy mixture conducive to high heat transfer rates. The mixture of vapor and liquid discharged from the upper ends of the tubes is caused to flow laterally and then downwardly through a downtake passage communicating with the lower end of the vaporizer. A vapor outlet is provided intermediate the ends of the downtake passage in such a manner that the vapor must change its direction of flow, preferably substantially 180°, thereby facilitating the removal of droplets, and also slugs and bubbles, by centrifugal action. The incoming feed is preferably released above the body of liquid in such a manner that any gases or vapors contained therein can escape from the feed while the latter is falling downwardly into the body of liquid.

14 Claims, 5 Drawing Figures

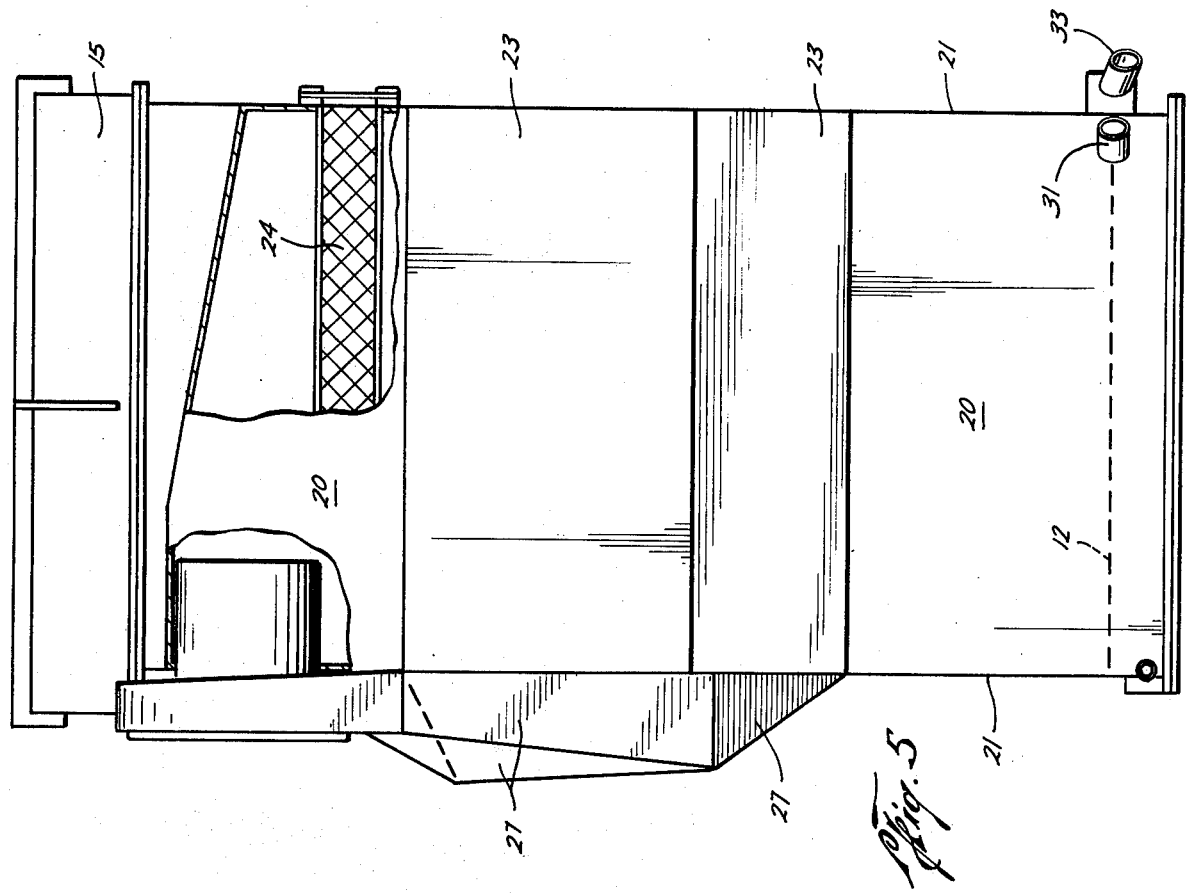
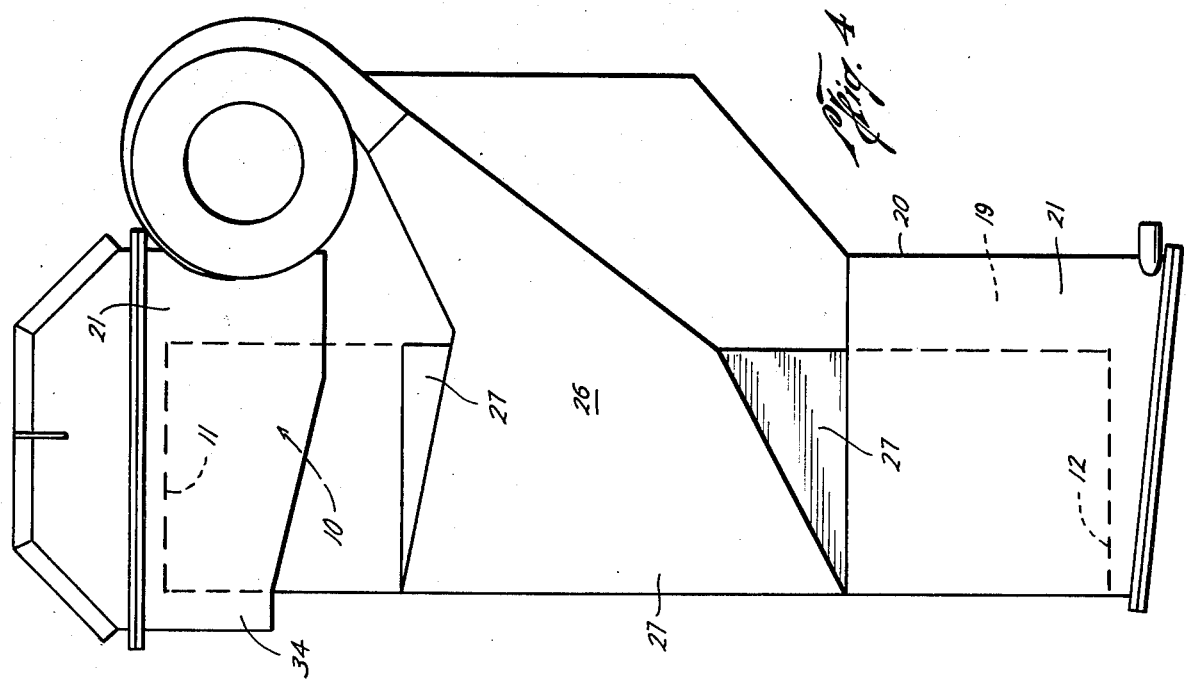

DISTILLATION APPARATUS AND METHOD

This is a continuation of application Ser. No. 605,293 filed Aug. 18, 1975 which application is a continuation-in-part of my application, Ser. No. 414,293, filed Nov. 9, 1973 both of which are now abandoned.

This invention relates to an improved apparatus and method for the vapor compression distillation of brackish water and seawater.

In the design of vapor compression type distillation units, one of the factors which greatly influences the initial capital cost per unit daily volume of distilled water has been the heat transfer rate factor, that is, the number of BTU's which can be transferred across one square foot of tube area per degree Fahrenheit temperature differential per hour. It has been recognized that this factor can be increased if the seawater within the tubes can be made to boil violently so that it takes on the overall consistency of a froth so that the heat transfer coefficient at the inner surface of the tube will increase for various theoretical reasons. However, as the liquid component of this froth is vaporized, the volume of the froth expands greatly and this correspondingly increases the velocity with which it is propelled up the tube. As a result, the frothy mixture could be expelled from the tube at very high velocities such that there would be entrainment of unvaporized liquid droplets and froth in the vapor. The separation of these droplets and froth then becomes a serious problem because if the amount thereof is excessive, any mist eliminator would become overloaded and fail to function properly with resultant carry over of liquid droplets containing relatively high concentrations of salt into the distilled water product. Also, the boiling action in the tube under such circumstances will become so violent that slugs of liquid would be propelled upwardly to add further to the separation problem if the separator or mist eliminator were above the top tube sheet as is conventional.

Several attempts have been made to solve this entrainment problem so as to permit the maintenance of high heat transfer rates, using low water levels and long tubes for efficiency. For example, several designs of mist eliminators have been suggested. Also, the additional use of cyclone separators to eliminate the droplets of water have been suggested. Further, the use of large domes above the vaporizer has been proposed in order that the vapor velocity can be reduced to permit dropout of the entrained liquid droplets. All of these proposals have disadvantages, one of which is that they increase the capital cost so much as to not be worthwhile.

Accordingly, design of the vapor compression distillation units has involved a compromise between the heat transfer rate and the minimizing of the entrainment problem. Thus, for any given design of mist eliminator, the amount of entrainment in the vapor which the eliminator can remove has a certain maximum value and the amount of actual entrainment must be maintained below this value. This in turn has dictated that the velocity of the vapor and accompanying liquid being discharged from the tubes must be limited to be below a given value so that the entrainment will not become so excessive the eliminator cannot handle it. The limiting of the vapor-liquid exit velocity has dictated the amount of vapor which can be generated in any given tube per unit of time. In order to limit this, other conditions being equal, it was necessary to limit the effective length of the tubes which was devoted to the generation of vapors. This length could be influenced by a number of factors including the physical length of the tube, the temperature of the seawater feed, the level of the liquid maintained in the lower end of the tubes, etc.

It is an object of this invention to provide an apparatus and method for the vapor compression distillation of brackish water or seawater wherein the arrangement is such that the water can be permitted to boil violently in the tubes to provide a frothy mixture over a very substantial portion of the length thereby resulting in high heat transfer rates while avoiding excessive entrainment in the vapors passing to the mist eliminator even though the vapor velocity from the discharge end of the tubes is very high.

Another object of the invention is to provide such an apparatus and method in which the effect of gravity, velocity, and inertia are utilized to minimize the entrainment of droplets in the vapor passing to the mist eliminator.

These and other objects, advantages and features of the invention will become more apparent to one skilled in the art upon consideration of the specification, the claims, and the attached drawings wherein:

FIG. 4 is an elevational view taken on the line 4—4 of FIG. 2; and

FIG. 5 is an elevational view, with parts broken away and taken on the line 5—5 of FIG. 2.

Figure 1:
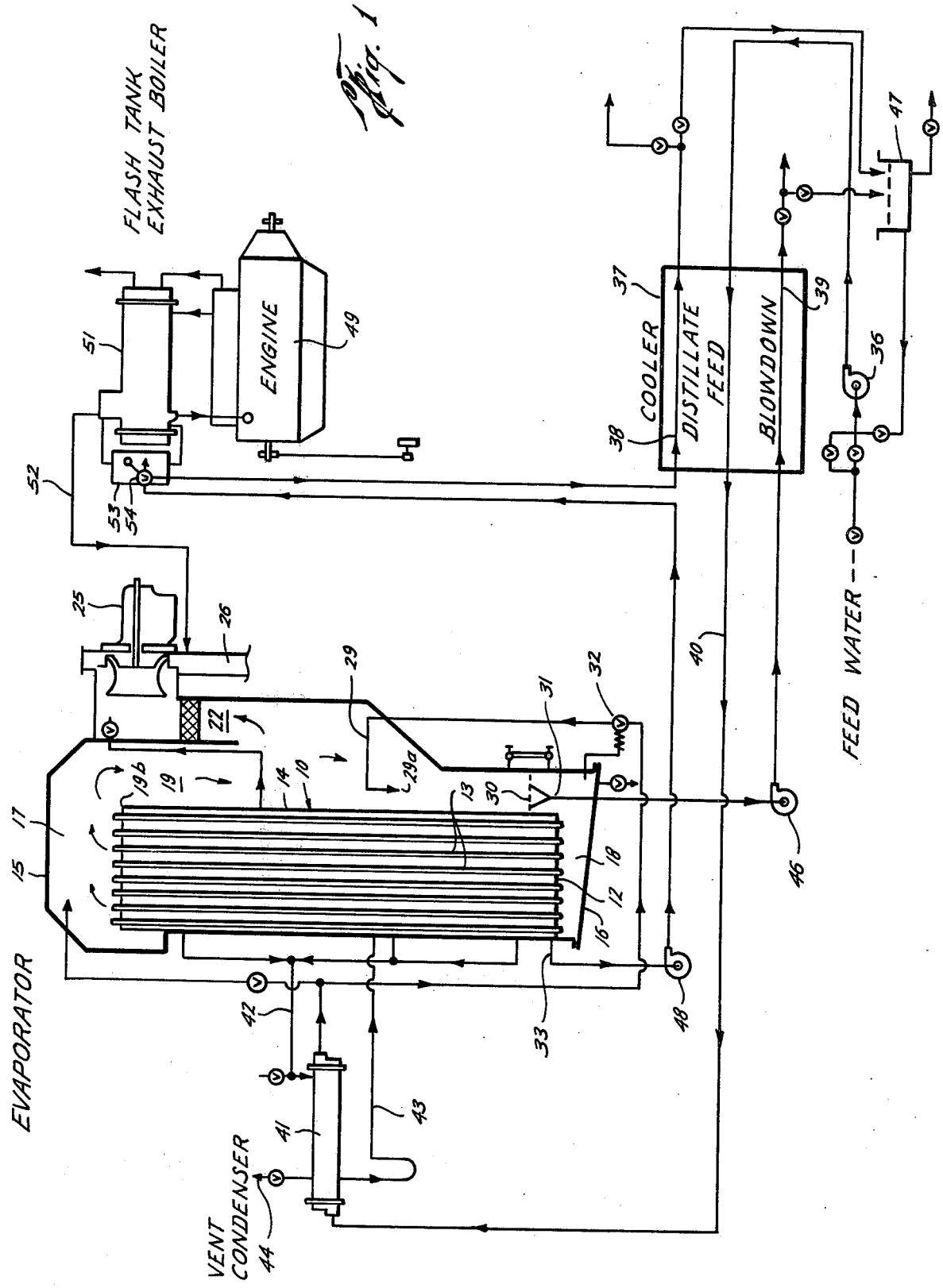
FIG. 1 is a semi-schematic drawing illustrating a preferred embodiment of the invention.
Figure 3:
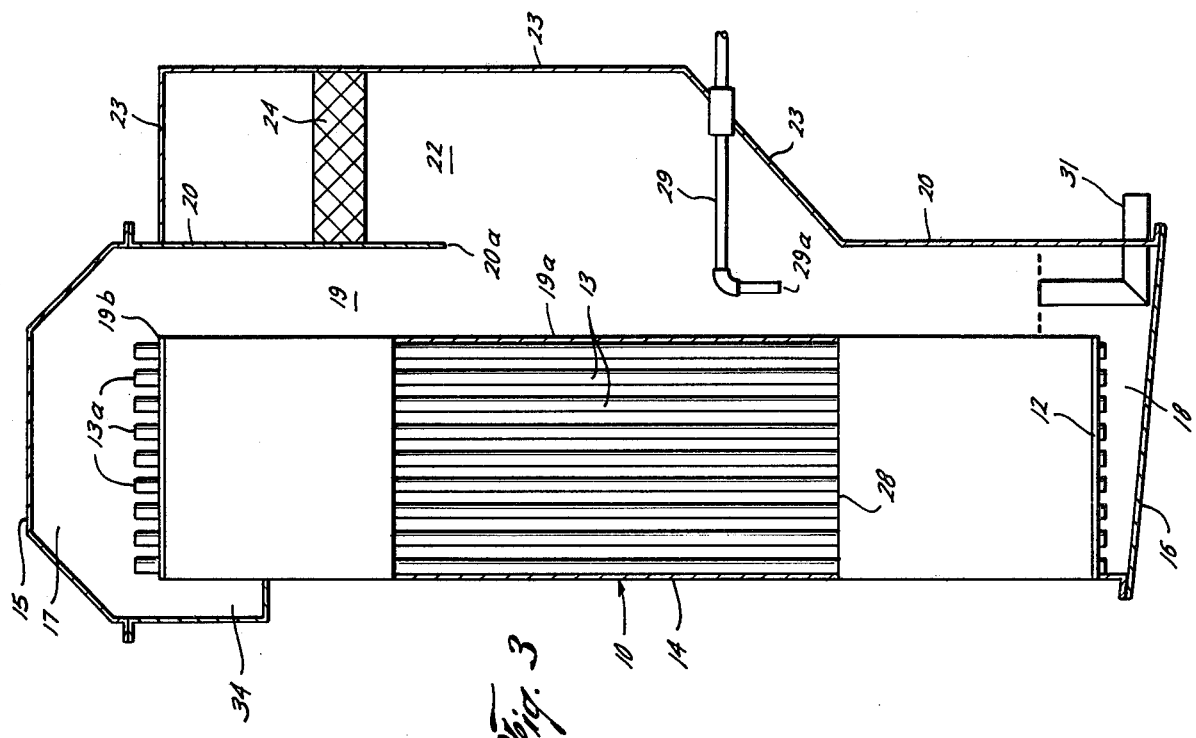
FIG. 3 is a view taken on the line 3—3 of FIG. 2.
Figure 2:
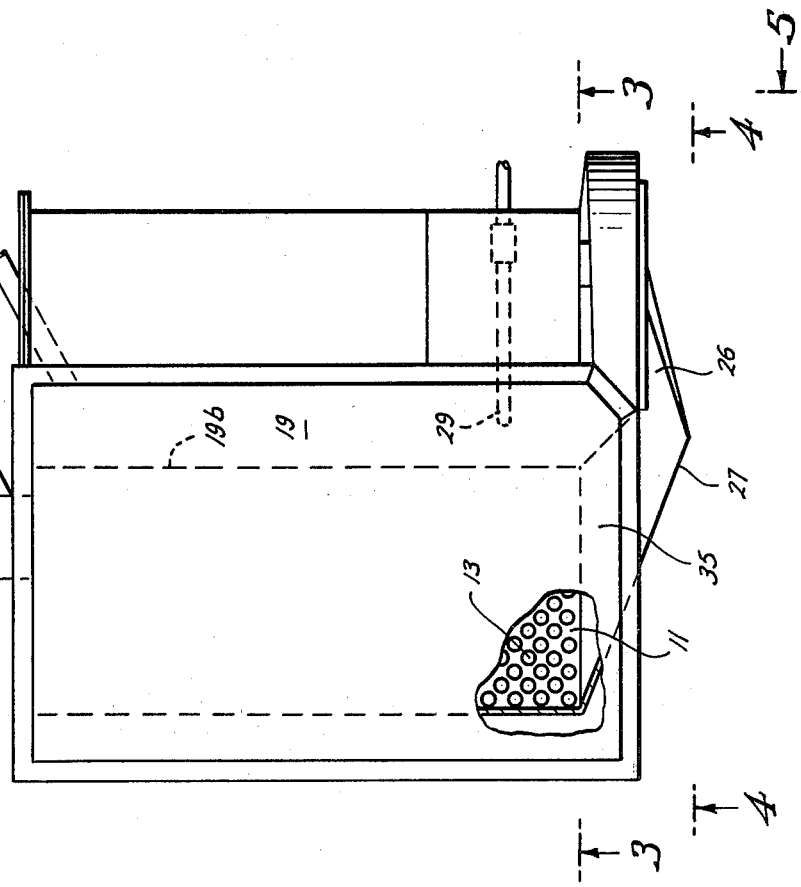
FIG. 2 is a plan view of the vaporizer or evaporator illustrated in FIG. 1.

In accordance with this invention, a vertical shell and tube type vaporizer or evaporator is arranged in a vapor compression distillation circuit. The vaporizer is provided with upper and lower closure members forming upper and lower chambers in fluid communication with the tubes. Means are provided forming a substantially unrestricted down-take passage between the chambers and this passage is located so that it is displaced laterally of the shell and has an inlet with an edge substantially flush with and extending along a substantial portion of the periphery of the upper tube sheet so that the liquid and froth on the upper tube sheet can flow laterally to pass down the downtake passage. At the same time, vapor generated in the tubes also flows laterally and passes down the downtake passage along with the circulation of liquid normal to natural circulation evaporators. In order to separate the vapor from the down flowing liquid and to minimize entrainment in the vapor before it reaches a mist eliminator, means are provided which form an upwardly extending vapor outlet passage which is laterally displaced and separated from the downtake passage and has an inlet therefrom at a level below that of the upper tube sheet. In this manner, the vapor will first flow laterally of the tube sheet through the upper chamber, downwardly through the downtake passage and then upwardly through the vapor outlet passage. In so doing, the vapor changes its direction of flow substantially (e.g., 180 degrees) and any droplets of liquid originally entrained therein tend to continue flowing downwardly toward the lower chamber thereby reducing the entrainment in the vapor.

A body of liquid to be distilled is maintained in the lower chamber and at a level sufficiently low that it is within the lower 25%, preferably the lower 20%, of the length of the tubes. The level should be low enough so as to minimize the amount of froth flowing laterally across the upper tube sheet but it also must be sufficiently high that the amount of frothy mixture emerging from the tubes is substantially uniform among the various tubes so as to assure that the distribution of the evaporative load is likewise substantially uniform among the various tubes and that all heat transfer surface is continually wetted. A low water level is also essential to keep hydrostatic head loss to a minimum.

With this overall arrangement, it is possible to obtain very high heat transfer rates without at the same time incurring any significant entrainment problems.

Referring now to the drawings, the evaporator or vaporizer 10 comprises a vertical shell and tube heat exchanger. Thus it includes an upper tube sheet 11 and a lower tube sheet 12 and a plurality of vertical tubes 13 extending therebetween. Also extending between the tube sheets and surrounding the tubes is a shell 14. The evaporator also includes upper and lower closure members 15 and 16 which form upper and lower chambers 17 and 18 in fluid communication with the upper and lower ends of the tubes, respectively. Extending between these chambers is a downtake or downcomer passage 19 which is formed by walls 20 and 21 and a sidewall 19a of shell 14. It will be noted that the downtake passage 19 is positioned laterally of the shell and tube evaporator for a reason which will be explained below.

Means are provided which form an upwardly extending vapor outlet passage 22 which is laterally displaced from the downtake passage 19. Such means include walls 23 as well as wall 20. The latter terminates at 20a so as to provide an inlet to the vapor outlet passage 22 from downcomer 19 at a level below that of the upper tube sheet.

A conventional mist eliminator 24 can be provided in the vapor outlet passage to eliminate a reasonable amount of entrained liquid droplets from the vapor.

A vapor compressor 25 is mounted to take suction from the upper end of vapor passage 22 and is adapted to compress such vapor to increase its heat content and then to discharge the compressed vapor into the shell of the evaporator where the vapor is condensed to give up its heat and cause evaporation of liquid within the evaporator tubes. Thus the discharge duct 26 is formed by walls 27 to extend from the compressor discharge to an opening 28 in shell 14 whereby compressed vapor from the vapor compressor 25 can flow into the shell as indicated above.

Means providing a feed inlet can take a form of a pipe 29 having a discharge port 29a preferably discharging downwardly into the downtake passage 19 at a point spaced above the liquid level 30. Thus the feed liquid, which is normally preheated to be slightly below or above its boiling point, is preferably discharged downwardly for free fall into the liquid in lower chamber 18 and during such fall, noncondensible gases as well as any steam formed by flashing can be separated from the liquid for flow upwardly and out the vapor outlet passage 22. The down falling feed liquid also may tend to break up any froth lying on the body of liquid therebelow.

A blowdown outlet pipe 31 is provided to be in fluid communication with the body of liquid in chamber 18. Preferably the blowdown outlet pipe opens into the downtake at a point which is as remote as possible from the feed inlet pipe 29 so as to minimize the feed bypassing directly to the blowdown pipe. The location of the inlet to this blowdown outlet pipe establishes the location of liquid level 30.

Means are provided for maintaining the liquid level 30 above the level of the lower tube sheet 12 and within the lower 25%, preferably the lower 20%, of the length of the tubes. Such means can be the blowdown outlet pipe and the location of its inlet as aforesaid. Thus the level should be adjusted to be low enough to minimize the amount of froth that must be passed upwardly through and out of the tubes and hence the amount flowing laterally across the top tube sheet. On the other hand, the level should be sufficiently high that the amount of frothy mixture flowing through the tubes is sufficient to continually wet the tube surfaces to assure that dry spots or localized concentration does not occur in the tubes. Thus, for example, if the water level is too high, there results excessive amounts of froth (or "circulation") being discharged from the tubes, with corresponding lower heat transfer rates. On the other hand, if the level is too low, the evaporating action in the upper portion of some of the tubes may cease all together with resultant over concentration of salts in these tubes and excessive scaling. This decreases the mean temperature difference between the condensing vapor and the liquid being evaporated which makes circulation in these tubes even more difficult to establish. In order to maintain a heat balance and a constant operating pressure and temperature, a temperature responsive valve 32 is placed in the feed pipe with its temperature sensing element exposed to the body of liquid in lower chamber 18. The valve can be of the adjustable type so that a particular temperature can be selected. A pressure sensitive valve would also function satisfactorily.

With this arrangement, it can be seen that a body of seawater is established at the lower end of the vaporizer or evaporator and has a level such as to extend into the lower ends of the tubes to be heated therein. As this heating continues, vapor is generated in the tubes and the violent boiling action coupled with vapor up-flow causes natural circulation in the form of froth, (slugs, droplets, and bubbles) as the mixture passes upwardly through the tubes. The velocity of this froth, and the great reduction in hydrostatic head it allows, increases the heat transfer rate with consequent evolution of greater amounts of vapor with resulting ever increasing frothing. Thus the mixture discharged from the top of the tubes comprises vapor, froth, (bubbles, slugs and droplets of liquid). The froth which is not carried away by the vapor as the latter flows to downtake passage 19 will fall on the top tube sheet and will drain therefrom into the downtake passage. It is desirable that the amount of froth and liquid on top of the top tube sheet be limited in its exposure to vapor emerging from the tubes in order that it cannot interfere with the discharge from the tubes so as to cause a back-pressure on the tubes. This can be accomplished by making the upper edge of the downtake passage adjacent the tube sheet to be substantially flush with the same and by extending this edge along a substantial portion of the periphery of the upper tube sheet. This permits the liquid and froth to more readily drain into the downtake passage and thereby limit their level on top of the top tube sheet. The top tube sheet should be substantially rectangular or trapezoidal in shape and have a length at least twice its width so as to provide the elongated edge 19a across the entire depth of the evaporator. Preferably the length to width ratio is within the range of 2.5 to 3.5. Also, if desired, the upper closure member 15 can extend down the other side of the tube sheet to provide an additional trough 34 so that liquid and froth on the top tube sheet can drain not only directly into downtake 19 but from the other side of the tube plate into trough 34. The trough 34 is connected to the downtake passage by a further trough 35. In most cases, it will be preferred not to use troughs 34 and 35 but there may be some instances, such as in very large evaporators, in which the auxiliary troughs can be used to advantage.

It is also preferred that the upper ends 13a of tubes 13 extend above the top tube sheet so as to minimize the chance of water on the top tube sheet falling back down into the tubes, or obstructing the flow of vapor and froth from the tubes. Also, these extensions isolate a certain depth of liquid on the top tube sheet from the vapor emerging from the tubes so as to minimize the generation of additional foam when operating under foaming conditions. Vapor passing thru a foaming froth tends to create additional foam.

After the vapor has passed laterally across the upper chamber 17, it will begin its downward travel in downtake passage 19. As it reaches the opening below the lower edge 20a of wall 20, it will flow out through such opening and thence upwardly through vapor outlet passage 22. As it flows from the downtake passage into the vapor outlet passage, it changes direction by approximately 180 degrees and any liquid droplets entrained therein tend to continue their downward course toward the lower chamber due to inertial and gravitational effects. The resultant vapor thus separated flows upwardly through mist eliminator 24 and then is compressed by compressor 25 to be discharged back to the shell side of the evaporator where it condenses to supply heat for the evaporation.

As the liquid and froth continue flowing downwardly in the downtake passage, they will eventually reach the body of water in the lower chamber. The froth will tend to float on the liquid and since the feed inlet discharge port 29a is spaced above the liquid level, the incoming feed will impinge on the froth and tend to disrupt it. Also, there may be some tendency for the droplets and slugs of water separating from the vapor to fall upon the froth further disrupting it.

The evaporator system shown in FIG. 1 includes the necessary additional equipment to provide a complete vapor compression distillation system of the engine driven type, but the same evaporator is applicable to electric motor driven types. Thus the feed can be passed to a feed pump 36 and then through a cooler 37 where it is preheated by heat exchange with the distillate in line 38 and with blowdown in line 39. The thus partially preheated feed passes through line 40 to a vent condenser 41 where it is further heated by heat exchange with noncondensibles and vapor passing from the shell side of the heat exchanger via line 42. Distillate condensed in condenser 41 can be returned to the shell side of the heat exchanger by line 43 while noncondensibles are withdrawn from the vent condenser via line 44. Usually, it will be desirable to preheat the feed so that it will be at a temperature slightly below, at, or slightly above its boiling temperature when discharged into the downtake.

Blowdown from the blowdown outlet pipe 31 can pass via line 45 to blowdown pump 46 which pumps it through the cooler 37 to preheat the feed after which it is discharged to waste. A portion of it can be passed to acid tank 47 and therein mixed with acid for periodic descaling and then returned as feed just ahead of feed pump 36.

A distillate pump 48 pumps a small portion of the distillate into the jacket water cooling system of engine 49. This engine discharges its exhaust gases into an exhaust boiler 51. Thus the distillate is passed to a distillate vessel 53 under the control of a level control valve 54 which admits enough distillate to the jacket water cooling system to compensate for the distillate which has been vaporized in the exhaust boiler and engine cooling jackets. The vapor so produced is passed via line 52 to be mixed with the discharge from compressor 25. At any rate the excess distillate flows through cooler 37 to product storage. A portion of it may be passed to acid tank 47 for mixing with acid and blowdown and recirculation through the evaporator during periodic descaling.

In order to increase the effective area per unit length of tube, and the heat transfer rate, tubes 13 are preferably of the extended area type, e.g., double fluted.

The evaporator design described above permits the use of tubes of larger diameter and of longer length than in conventional evaporators of this general type thereby reducing the cost of manufacture since fewer tubes can be used to obtain a given amount of distillate. The longer tubes and the higher heat transfer rate result in higher tube outlet velocities which can be accommodated in this evaporator design but which cannot be tolerated in conventional natural circulation vertical tube seawater evaporators.

From the foregoing, it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A vapor compression distillation apparatus comprising, in combination, a vertical shell and tube vaporizer having upper and lower tube sheets with tubes extending vertically therebetween and also having upper and lower closure members forming upper and lower chambers in fluid communication with said tubes; means forming a substantially unrestricted downtake passage vertically from the upper to lower chamber with the passage having an inlet from the upper chamber laterally displaced from the upper tube sheet and having an upper edge substantially flush with and extending along a substantial portion of the periphery of such tube sheet so that liquid on the upper tube sheet can flow laterally thereacross and across said edge to then directly fall vertically down the downtake passage to the lower chamber, said downtake passage inlet also being disposed so that vapor emerging from said tubes must flow downwardly in the downtake passage along with said liquid; means forming an upwardly extending vapor outlet passage laterally displaced and along side a portion of said downtake passage and having an inlet from the downtake passage at a level below that of the upper tube sheet so that vapor flowing downwardly in the downtake passage must reverse its direction of flow in order to flow up said vapor outlet passage; vapor compression means having a suction inlet in an upper portion of said vapor outlet passage and a vapor discharge outlet into the shell side of said vaporizer; a distillate outlet from the shell side of the vaporizer; means for maintaining a liquid level in the lower portion of the vaporizer on the tube side thereof but above the level of the lower tube sheet; and a feed inlet arranged to discharge feed into the tube side of the vaporizer.

2. The apparatus of claim 1 wherein the feed inlet is also arranged to discharge the feed into the downtake passage above said liquid level.

3. The apparatus of claim 1 wherein said upper tube sheet is trapezoidal in shape and has a length at least twice its width so as to provide an elongated edge and wherein said downtake passage extends along the length of said elongated edge.

4. The apparatus of claim 3 wherein said tubes have discharge openings above the upper tube sheet so that liquid on the tube sheet cannot flow back into the tubes.

5. The apparatus of claim 1 wherein said tubes have discharge openings above the upper tube sheet so that liquid on the tube sheet cannot flow back into the tubes.

6. A vapor compression distillation apparatus for distilling brackish water or seawater comprising, in combination, an evaporator including an upright shell and upper and lower tube sheets with a plurality of tubes extending vertically therebetween, said upper tube sheet being trapezoidal in shape and having a length at least twice its width so as to provide one elongated edge lengthwise thereof; said evaporator also including means providing upper and lower chambers above and below said tube sheets and a substantially unrestricted vertical downtake passage communicating therebetween, said downtake passage extending vertically downwardly along one side of the shell into the lower chamber and having an upper inlet extending substantially flush along said elongated upper tube sheet edge to facilitate drainage of liquid off of the upper tube sheet for vertical downward flow to the lower chamber, an upwardly extending steam outlet passage disposed laterally of and along side a portion of the downtake passage and having an inlet opening from said downtake passage intermediate the ends of the downtake passage and at a level below that of the upper tube sheet so that steam flowing downwardly in said downtake passage from the upper chamber must substantially change its flow direction to flow from said downtake passage through said steam outlet passage; vapor compression means having a suction inlet from said steam outlet passage and a discharge outlet into the shell side of said evaporator; a distillate outlet from the shell side of said evaporator; means for maintaining the level of liquid in the lower portion of the evaporator on the tube side thereof at a level above the lower ends of said tubes but not exceeding one-fourth of the length of said tubes; and a feed inlet arranged to discharge feed into the liquid in the lower portion of the evaporator.

7. The apparatus of claim 6 wherein the tubes effectively extend to have their discharge openings substantially above the upper tube sheet so that a large portion of the liquid and froth falling back on the upper tube sheet cannot flow back into the tubes but must flow across the tube sheet to the downtake passage.

8. The apparatus of claim 6 wherein said evaporator also includes a trough along a second elongated edge of the upper tube sheet opposite said one elongated edge so that liquid and froth are drained from both sides of the tube sheet, said trough communicating with said downtake passage to discharge liquid and froth thereinto.

9. The apparatus of claim 6 wherein said steam outlet passage extends upwardly parallel to said vertically disposed downtake passage so that steam flowing downwardly in the downtake passage must change its direction 180 degrees to flow vertically upwardly in the steam outlet passage to the vapor compression suction inlet.

10. The apparatus of claim 6 wherein said upper tube sheet is substantially rectangular and has a length to width ratio in the range of 2.5 to 3.5.

11. A vapor compression distillation apparatus for distilling brackish water or seawater comprising, in combination, an evaporator including an upright shell and upper and lower tube sheets with a plurality of tubes extending vertically therebetween, said upper tube sheet being trapezoidal in shape and having a length at least twice its width so as to provide one elongated edge lengthwise thereof; said evaporator also including means providing upper and lower chambers above and below said tube sheets and a substantially unrestricted vertical downtake passage communicating therebetween, said downtake passage extending vertically downwardly along one side of the shell into the lower chamber and having an upper inlet extending substantially flush along said elongated upper tube sheet to facilitate drainage of liquid off of the upper tube sheet to then directly fall downward to the lower chamber, an upwardly extending steam outlet passage disposed laterally of and along side a portion of the downtake passage and having an inlet opening from said downtake passage intermediate the ends of the downtake passage and at a level below that of the upper tube sheet so that steam flowing downwardly in said downtake passage from the upper chamber must substantially change its flow direction to flow from said downtake passage through said steam outlet passage; vapor compression means having a suction inlet from said steam outlet passage and a discharge outlet into the shell side of said evaporator; a distillate outlet from the shell side of said evaporator; means for maintaining the level of liquid in the lower portion of the evaporator on the tube side thereof at a level above the lower ends of said tubes but not exceeding one fifth of the length of said tubes; and a feed inlet arranged to discharge feed into the liquid in the lower portion of the evaporator.

12. A method for distilling brackish water or seawater using a vertical shell and tube vaporizer comprising the steps of establishing a body of water at the lower end of the vaporizer with a level such as to extend into the lower ends of said tubes to be heated therein in such a manner that the discharge from the tubes is a frothy mixture of vapor and liquid, flowing such vapor and liquid laterally to one side of the vaporizer for passage across said edge to then directly fall vertically downwardly to a lower chamber of the vaporizer, separating the thus downflowing vapor from the liquid by causing the vapor to flow laterally at a level below the upper end of said tubes and then upwardly to thereby subject any liquid droplets contained therein to centrifugal force and gravity, the liquid droplets returning to the vertically down flowing liquid in the downtake passage;

compressing the separated vapor and then passing it in heat exhange relation to the liquid being vaporized in the tubes; feeding feed water into said body of water; and maintaining the level of said body of water sufficiently low as to minimize the amount of froth that must be passed upwardly through and out of the tubes, but sufficiently high that the tube heat transfer surface will be continually wetted so as to assure that dry spots or localized concentration are minimized.

13. The method of claim 12 wherein the step of separating the vapor from the liquid includes causing the vapor to change its direction of flow by 180 degrees after it has first flown downwardly, so that centrifugal action will be aided by the force of gravity in separating the liquid from the vapor.

14. The method of claim 12 wherein the feed water is released at a point above said body of water to permit it to fall into said body of water and to permit any gases or vapors in the released feed water to escape therefrom prior to the feedwater falling into said body of water.

* * * * *